Patented Apr. 27, 1926.

1,582,467

UNITED STATES PATENT OFFICE.

GEORGE SAMUEL HAY, OF WESTMINSTER, LONDON, ENGLAND, ASSIGNOR TO ASPHALT COLD MIX (1925) LIMITED, OF WESTMINSTER, LONDON, ENGLAND.

BITUMINOUS EMULSION.

No Drawing.  Application filed August 18, 1925.  Serial No. 51,040.

*To all whom it may concern:*

Be it known that I, GEORGE SAMUEL HAY, subject of the King of England, residing at 38, Parliament Street, Westminster, London, S. W. 1, England, have invented certain new and useful Improvements in Bituminous Emulsions (for which I have filed British applications No. 13424/24 filed May 31, 1924, and No. 5581/25 filed Feb. 28, 1925), of which the following is a specification.

This invention consists in improvements in or relating to aqueous emulsions, prepared from bituminous material and suitable as a binding medium in road-making or in the manufacture of coal briquettes, or for imparting a preservative coating to stone, wood, metal or the like as on buildings or fencings; or for impregnating concrete or the like, or for preserving felt and other materials used for roofing.

An object of the invention is to produce an emulsion which will pour quite readily, which is miscible in water in any proportions and which is substantially stable, that is to say an emulsion the constituents of which will not readily separate from one another.

Broadly stated, the process according to the present invention consists in mixing together molten or liquid bituminous material, a small proportion (up to 10%) of an emulsifying agent comprising starch (e. g. potato starch or maize starch) or other farinaceous substance (e. g. ground rice, rice meal or wheat middlings) or dextrin, and an aqueous solution of alkali.

One form of the process consists in melting solid bitumen (e. g. of the type artificially prepared from petroleum, such as Mexican asphalt), adding thereto with agitation, first a proportion up to about 10% of starch or like substance or dextrin, and then a dilute solution of alkali (preferably caustic potash or soda) and maintaining the heating and agitation until emulsification has taken place.

In a further form of the process the molten or liquid bitumen is first mixed with a dilute aqueous solution of alkali (the alkali being poured into the bitumen or the bitumen into the alkali) and the emulsifying agent aforesaid, with or without further alkali and/or water thereafter incorporated.

According to a feature of the invention fatty acid or other known emulsifier may be used in place of a portion of the starch or dextrin. In one example fatty acid is first added to the bitumen, then the starch or like substance is incorporated in the form of an alkali gel and finally a dilute solution of alkali with or without further water is added.

Successful emulsions have been obtained with various forms of starch as the emulsifying agent, for example wheat starch, potato starch and arrowroot starch. Where fatty acid is employed as partly replacing the starch, considerably smaller proportions of the emulsifying agent are required in order to produce stable emulsions. Proportions as low as one-half-per cent of each constituent (making a total of 1% of emulsifier) have proved successful.

Some examples embodying the present invention will now be described.

Example I.

Bitumen in the form of Mexican asphalt was melted in a tank having an external heating jacket and a rotatable paddle for agitating the contents of the tank. When the bitumen was at a temperature of about 215–225° F. 4% of starch (reckoned by weight on the bitumen) was incorporated, the starch being in the form of a fine dry powder. After the starch had been thoroughly mixed in with the bitumen, a 2% aqueous solution of caustic potash was poured into the tank, the quantity of potash solution employed being equivalent to 0.56% KOH by weight reckoned on the bitumen. Finally boiling water was added in quantity sufficient to bring up the water content in the emulsion to about 100 parts per 100 of the bitumen. Agitation of the contents of the tank was continued during the additions specified above and the temperature was maintained in the region of 215–225° F. until emulsification had been effected.

In this particular example emulsification appeared to take place very gradually and it was necessary to continue agitation for some considerable time after the addition of water.

Example II.

In this example a small proportion of fatty acid was employed in place of a portion of the starch emulsifier. Mexican asphalt was melted as before and the starch in dry powdered form then introduced, the quantity of starch being 0.5% by weight reckoned on the bitumen. Oleic acid (Prices "A") in the proportion 0.5% by weight reckoned on the bitumen was now added to the contents of the tank, followed by the addition of a 2% aqueous solution of caustic soda in quantity equivalent to 0.2% NaOH by weight reckoned on the bitumen. Finally hot water was added to bring up the proportion of water in the finished emulsion to about 100 parts per 100 of the bitumen.

*Example III.*

In this example the starch was incorporated in the form of an alkali gel the following procedure being followed. The gel was first prepared from 16 parts by weight of starch, 4 parts by weight of caustic potash and 80 parts by weight of water. 2% of this mixture by weight reckoned on the bitumen was then introduced into the molten bitumen (Mexican asphalt) and followed by the addition of 2% of oleic acid. After thorough incorporation of the emulsifying agents a 2% aqueous solution of caustic potash (in quantity equivalent to 0.28% KOH by weight on the bitumen) was added. Finally a further addition of water was made in order to bring up the proportion in the finished emulsion to about 100 parts of water per 100 of the bitumen.

*Example IV.*

In this case dextrin was employed as the emulsifying agent, the process being carried out exactly the same way as that described in Example I. The proportions were as follows:

| | Parts. |
|---|---|
| Bitumen | 100 |
| Dextrin | 2.5 |
| Caustic potash | 0.5 |
| Water | 100 |

Various modifications may be made in the examples given above. In place of caustic soda or caustic potash other alkalies may be employed; for instance sodium or potassium carbonate, or sodium or potassium silicate may be used in equivalent proportion. In some cases the various ingredients may be added to the bitumen in a cold state, although it is generally preferable to add the alkali solution and the water at a temperature near boiling point. Modifications may be made in the order in which the ingredients are incorporated. For example, as already indicated the bitumen may be first treated with a dilute alkali solution, and the emulsifying agent subsequently incorporated, or the bitumen may be added to the starch or to a mixture of starch and alkali. Bitumen other than of the type artifically prepared from petroleum may also be used in the present process for example bitumen in the form of a viscous liquid such as tar may be employed.

The emulsion described herein is a liquid which pours quite easily, which does not readily separate out into its constituents and which can be transported in any convenient receptacles and used at ordinary temperatures. It is important that its use say in road-making does not necessitate the application of any heat.

In my broadest claims I have used the sub-generic term "starch-dextrin type" to cover an emulsifying agent of starch or dextrine.

What I claim as my invention and desire to secure by Letters Patent is:

1. A process for producing an aqueous bituminous emulsion which consists in separately mixing with bitumen in molten form, a dilute aqueous solution of alkali, and a proportion less than 10%, reckoned by weight of the bitumen, of an emulsifying agent comprising a substance of the starch-dextrin type.

2. A process for producing an aqueous bituminous emulsion which consists in melting solid bitumen of the type artificially prepared from petroleum, adding thereto with agitation a proportion less than 10% of an emulsifying agent comprising a substance of the starch-dextrin type, and then separately adding a dilute aqueous solution of alkali, and maintaining the heating and agitation of the mixture until emulsification has been effected.

3. A process for producing an aqueous bituminous emulsion which consists in melting Mexican asphalt and when at a temperature about 215 to 225° F. mixing therewith first a proportion less than 10%, reckoned by weight of the bitumen, of an emulsifying agent comprising starch, then separately a hot dilute solution of alkali and finally adding hot water to this mixture.

4. A process for producing an aqueous bituminous emulsion which consists in melting bitumen at a temperature in the region of 215 to 225° F., first adding to the molten bitumen with agitation a small proportion of starch less than 10%, reckoned by weight of the bitumen, and thereafter separately incorporating a hot dilute solution of caustic alkali together with hot water, and maintaining the heating and agitation of the mixture until emulsification has been effected.

In testimony whereof I affix my signature.

GEORGE SAMUEL HAY.